UNITED STATES PATENT OFFICE.

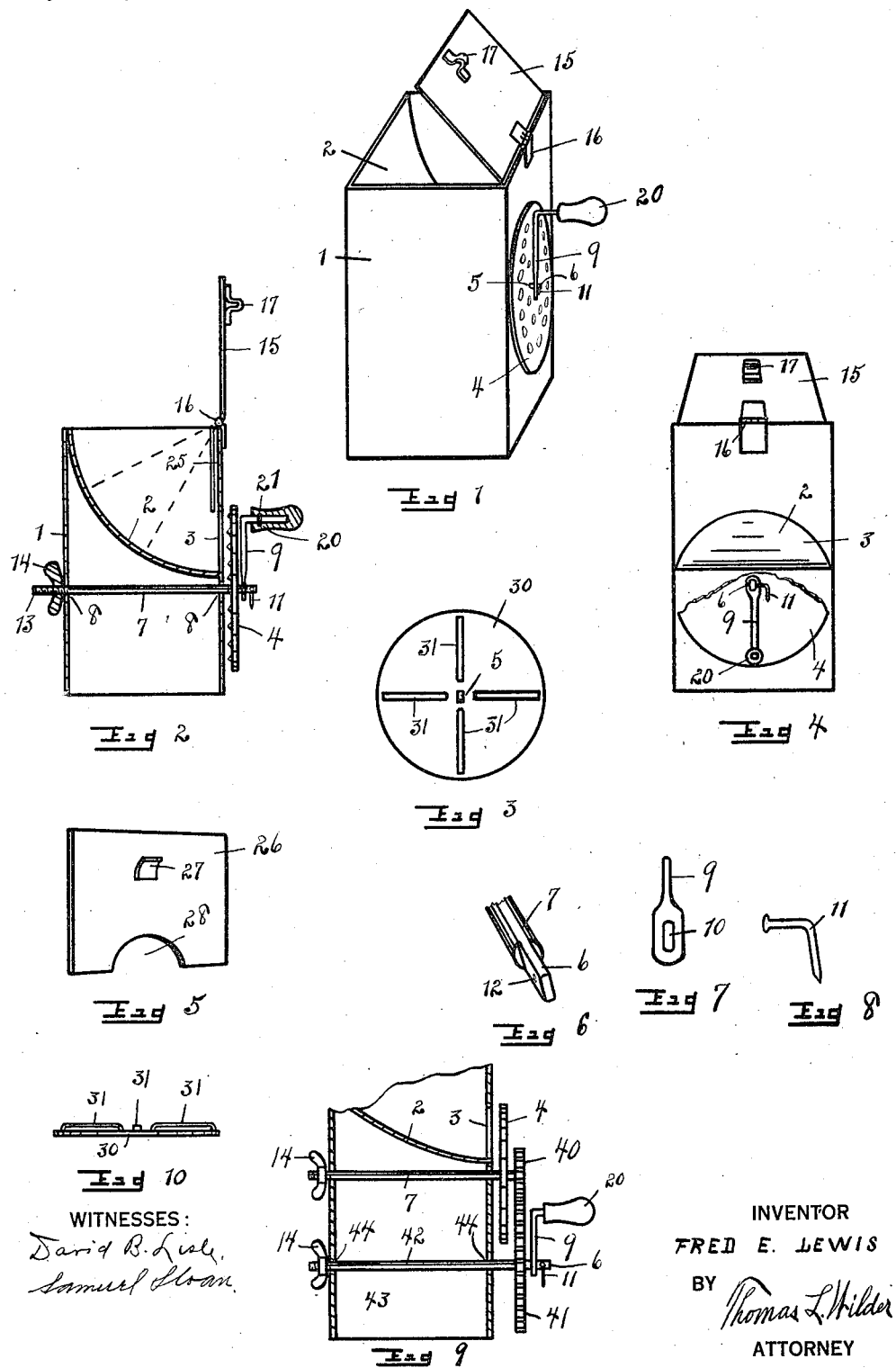

FRED E. LEWIS, OF UTICA, NEW YORK.

GRATER.

1,317,628.     Specification of Letters Patent.    Patented Sept. 30, 1919.

Application filed May 11, 1914. Serial No. 837,651.

*To all whom it may concern:*

Be it known that I, FRED E. LEWIS, citizen of the United States, residing at Utica, in the county of Oneida and State of New York, have invented certain new and useful Improvements in Graters, of which the following is a specification, reference being had therein to the accompanying drawing.

My invention relates to a grater, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a grater for use in the ordinary household in grating nutmegs, lemons, cheese and other like food products. The device is of simple and efficient construction. Furthermore, it effects the grating of the products mentioned by a rotary motion in place of the filing instruments heretofore employed. These features may be understood from a reference to the drawings in which:

Figure 1 is a perspective view of the grater;

Fig. 2 is a side elevation, partially in section of the grater;

Fig. 3 is a plan view of a circular knife employed;

Fig. 4 is a front elevation of the grater, showing parts broken away;

Fig. 5 is a perspective view of a member having an aperture or opening varying in size from that of the casing;

Fig. 6 is an enlarged perspective view in fragment, of the shaft;

Fig. 7 is an enlarged fragmentary view of the crank handle;

Fig. 8 is an enlarged side elevation of a nail employed;

Fig. 9 is a fragmentary view, partially in section of a modified form of the grater;

Fig. 10, is a side elevation of the circular knife.

Referring to the drawings in a more detail manner, the device embodies a casing —1— which is in the form of a rectangular shaped box having a concave or circular base 2 upon which the food products to be grated are disposed. The base 2 leads to an aperture or opening 3 almost semi circular in shape. The opening 3 is adapted to be normally covered by a circular grater 4, provided with an angular orifice 5, so as to be detachably mounted to the shouldered end 6 of the shaft 7 that has bearings at 8—8 in the casing —1—. There is also detachably mounted on the shouldered end 6 of the shaft 7 a crank 9 having a corresponding angular shaped hole 10 to fit on said end 6. The crank 9 is held in assembled position by a pin or nail 11 which is projected through the aperture 12 of the end 6. There is mounted upon the right angular portion of the crank 9, a handle 20, which is adapted to turn thereon and is secured by the annular boss 21 integral with the crank 9 and loosely fitting into a corresponding recess in the handle 20.

The end 13 of the shaft 7 is threaded for the reception of the winged nut 14, whereby the shaft 7 can be adjusted in a longitudinal manner, so as to govern the distance of the grater 4 with reference to its nearness to the opening 3 of the casing —1—, whereby to accommodate graters whose teeth vary in size. A cover 15 is hinged to the casing —1— at 16 and is adapted to swing down within the upper chamber, as shown by the dotted lines, whereby to normally push the food products against the grater 4. The cover 15 is provided with the handle or knob 17.

The upper chamber has a guideway 25 formed on either side thereof for the mounting, if desired, of the detachable plates or members 26 provided with the finger piece 27 and the aperture 28 which vary in size with the opening or aperture 3 of the casing 1.

The operation of the device is effected by first mounting the proper grater 4 to the end 6 of the shaft 7 and by then turning the winged nut 14 to regulate the position of the grater 4 with reference to its nearness to the opening 3. The food product to be grated is disposed in the upper chamber of the casing —1— upon the circular base 2 and the cover 15 pressed down thereagainst to crowd the product toward the grater 4 which is revolved by means of the handle 9.

In the event that a grater 4 having teeth either smaller or larger than the one employed is required or in the event that a slicer is needed, the grater 4 can be detached by withdrawing the pin 11 and crank 9 and substituting such grater or the slicer 30 having the knives 31, as shown in Figs. 3 and 10.

Fig. 9 shows a modification with respect to the velocity of revolution of the grater. The shaft 7 has keyed to its outer end a pinion 40 in mesh with a spur gear 41 which is keyed to the shaft 42 having bearings in the casing 43, as at 44—44. The casing 43 is constructed in all other features similar to the casing —1— of the former model. The shaft 42 is revolved, whereby to revolve the gear 41, pinion 40, and the grater by a crank 9 and handle 20, as heretofore described. Obviously a single revolution of the gear 41 will cause several revolutions of the pinion 40 and the grater 4.

Having thus described my invention, what I claim as new and desire to secure by Letters Patent is:

1. In a grater, the combination of a casing having an arc shaped discharge opening, a curving base leading to said opening, a circular grater conforming in size to the arc shaped opening, a shaft mounted in said casing for supporting the grater, a cover adapted to push the food products toward the grater, and a removable plate within said casing having an arc shaped opening of less size than the opening in the casing to reduce the effective feeding function of the discharge opening.

2. In a grater, the combination of a casing having an arc shaped discharge opening, a curving base leading to said opening, a circular grater conforming in size to the arc shaped opening, a shaft mounted in said casing for supporting the grater, a cover adapted to push the food products toward the grater, a removable plate having an arc shaped opening of less size than the opening in the casing to reduce the effective feeding function of the discharge opening in said casing, and guideways in said casing for mounting said removable plate.

In testimony whereof I have affixed my signature in the presence of two witnesses.

FRED E. LEWIS.

Witnesses:
SAMUEL SLOAN,
T. L. WILDER.